Aug. 7, 1956 R. B. JOHNSON 2,757,866

TRANSLATOR FOR RECORD CONTROLLED MACHINES

Filed March 7, 1955 7 Sheets-Sheet 1

INVENTOR.
REYNOLD B. JOHNSON

BY

F. W. Lowritzer

ATTORNEY

TRANSLATOR FOR RECORD CONTROLLED MACHINES

Filed March 7, 1955

7 Sheets-Sheet 2

INVENTOR.

REYNOLD B. JOHNSON

BY J. W. Rommitzer

ATTORNEY

INVENTOR.
REYNOLD B. JOHNSON
BY
F. W. Lommitzer
ATTORNEY

INVENTOR.
REYNOLD B. JOHNSON
BY J. W. Lounitzer
ATTORNEY

Aug. 7, 1956 R. B. JOHNSON 2,757,866

TRANSLATOR FOR RECORD CONTROLLED MACHINES

Filed March 7, 1955 7 Sheets-Sheet 5

*INVENTOR.*
REYNOLD B. JOHNSON

*BY* J. W. Lowenitzer

ATTORNEY

Aug. 7, 1956 R. B. JOHNSON 2,757,866

TRANSLATOR FOR RECORD CONTROLLED MACHINES

Filed March 7, 1955 7 Sheets-Sheet 6

*INVENTOR.*
REYNOLD B. JOHNSON

*BY* F. W. Lowenitzer

ATTORNEY

TRANSLATOR FOR RECORD CONTROLLED MACHINES

Filed March 7, 1955 7 Sheets-Sheet 7

INVENTOR.
REYNOLD B. JOHNSON
BY
J. W. Lounitzer
ATTORNEY

United States Patent Office 2,757,866
Patented Aug. 7, 1956

2,757,866

TRANSLATOR FOR RECORD CONTROLLED MACHINES

Reynold B. Johnson, Palo Alto, Calif., assignor to International Business Machines Corporation, New York, N. Y., a corporation of New York Application March 7, 1955, Serial No. 492,701

6 Claims. (Cl. 235—61.11)

The invention relates to accounting machines and more particularly to record controlled accounting machines which require translating mechanisms for converting combinational code representations to a single unit code.

It is known that additional data representing capacity of a record card can be increased by utilizing a combinational code, and the problem then arises as to the provision of a suitable translating mechanism which converts the combinational code to a digit code, wherein each digit 0–9 is represented by a differentially timed impulse. Such impulses are utilized to control printing mechanisms and accumulators of a well known form of machine shown in the patent to R. E. Page, N. 2,438,071.

The main object of the present invention is to solve said problem by providing a translator mechanism which is simple in construction, efficient in operation and is capable of being mounted within the confines of the narrow column spacing of a record.

It is a further object of the invention to devise a translator mechanism for converting a five-unit combinational code to a single unit digit code 0–9 by an arrangement which is simpler than heretofore devised, and which will easily fit in a well known form of record controlled accounting machine.

According to the present invention a reciprocable analyzer support plate carries a plurality of analyzer plates which have projections to analyze the card and are adapted in accordance with the combinational holes analyzed to have different relative positions on the support plate and with respect to each other, and said analyzer plates have integral notched permutation code bars which, in their different relative positions, provide at a test position a clear entrance notch across the edges of the bars for a seeker member; and provides means to move said support plate and permutation code bars to present in succession the notches of the code bars to said seeker member, whereby at a certain timed position of said code bars the seeker member finds a clear entrance in aligned notches and effects closure of contacts to emit a differentially timed digit impulse.

Another feature and object of the invention is to form said analyzer plates so that they are stacked at their code bar ends but are divergently spaced at their other ends in one plane so that the analyzer projections may enter holes in a related column of the record.

A still further feature is to provide means to frictionally hold the analyzer plates to said support plate in order that a reciprocation of the latter causes the analyzer projections to either strike the surface of the card, or enter related holes which cause a relative movement of certain analyzer plates with respect to others and shifts the code bars to provide at a certain position a clear entrance notch for the seeker member.

Another relatively important object of the invention is to cause successive reciprocations of the analyzer plates with an intermediate shift of the card, in order that holes which are displaced from true hole locations may be sensed without, however, interfering with the analyzer projections which have entered the card holes at true locations.

A still further object of the invention is to provide means to restore certain analyzer plates and code bars which have been displaced with respect to the others, preparatory to the analyzing of a second record.

A still further object is to provide means to suppress said restoring means to enable the analyzer plates and code bars to be retained in relatively displaced positions, in order that the same data can be repeatedly used for either printing or digit entry.

While the present translating arrangement has been devised for the conversion of a five-unit code to a single digit code 0–9, it is evident that by suitably changing the notches of the code bars, and providing a number of analyzer plates and code bars consistent with the number of units in other codes, other combinational codes may be translated. It is to be understood, therefore, that the present arrangement is merely by way of disclosure of one embodiment of the invention, and is not restrictive.

Other objects of the invention will be pointed out in the following description and claims and illustrated in the accompanying drawings, which disclose, by way of example, the principle of the invention and the best mode, which has been contemplated, of applying that principle.

*Card feeding mechanism*

The present translator is supported by parallel side frames 20 and 21 of a well known form of card feeding mechanism shown in the patent to J. R. Peirce, No. 1,827,259, issued October 13, 1931, and since the card feeding mechanism is well known, it will be described only sufficient to show its coordination with the present translator.

Figure 1:
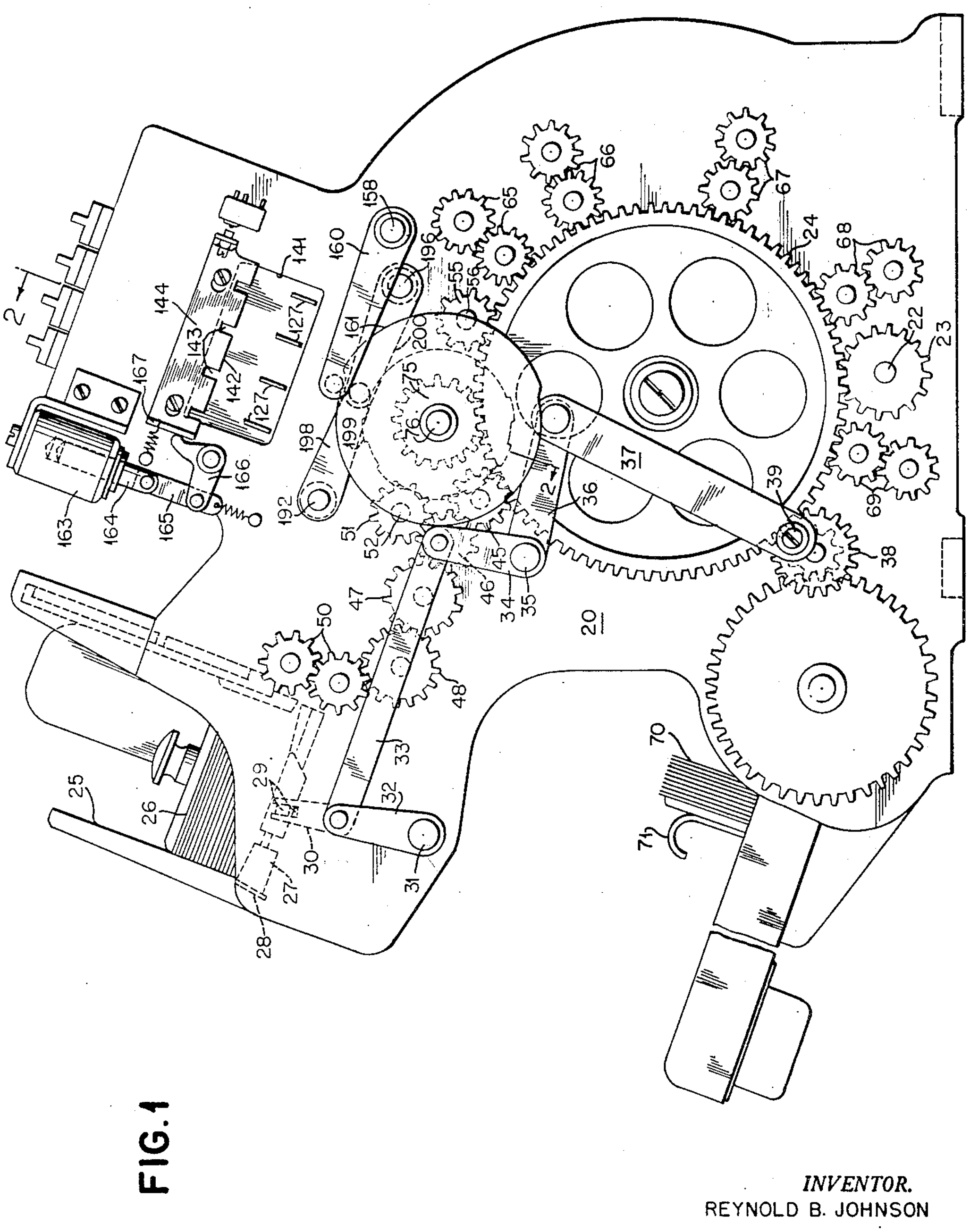
Fig. 1 is a view in side elevation showing principally the gear drive train for the feeding rollers and picker mechanism of a card feed mechanism of a well known form of record controlled accounting machine, this view also showing the gear drive to the principal operating shaft for driving various mechanisms of the present improvement.

Power for driving the card feeding mechanism as well as the various mechanisms of the present record analyzing mechanism is derived from a driving shaft 22 (Fig. 1) carrying a pinion 23 meshing with a ring gear 24. The record cards to be analyzed by the present analyzing mechanism are fed from a supply hopper 25 and resting upon the stack is a pressure plate 26. The cards are fed singly from the hopper by the usual card picker mechanism and comprises a slidably mounted reciprocable plate 27 carrying a picker knife 28 for cooperation with the record cards. The plate 27 has a pin-slot connection 29 to an arm 30 secured to a rock shaft 31 which carries at its end outside of the side frame 20 and arm 32 which has a link connection 33 to an arm 34 secured to a supplemental rock shaft 35. Rock shaft 35 has connected thereto an arm 36 connected by a link 37 to a pinion 38, which pinion is driven by the ring gear 24, it being observed that the link 37 is eccentrically mounted at 39 on the pinion 38. Each reciprocation of arm 30 causes the card to be fed from the hopper to feed rollers which convey it through the analyzing mechanism. From ring gear 24 there is a gear drive comprising intergeared pinions 45, 46, 47, 48 to drive a pair of intergeared pinions 50 which are the drive shafts for feeding rollers which feed the card issuing from the magazine 25 to the present analyzer and translator unit. Pinion 46 meshes with a pinion 51 secured to a feed roller drive shaft 52. The ring gear 24 also meshes with a pinion 55 secured to a feed roller shaft 56. Said feed roller drive shafts 52 and 56 are concerned with the present invention since they carry respective feed rollers 57 and 58 (Figs. 3 and 4), the feed rollers 57 and 58 cooperating with respective spring-pressed feeding rollers 59 and 60. Hence, it will be observed, noting Fig. 4, that feed rollers 57 and 59 feed the card to the present analyzer and translator mechanism and after the analyzing and translating operation feed rollers 58 and 60 then feed the record out of the analyzing mechanism.

Thereafter, the record is fed in a path concentric with respect to the center of the ring gear by pairs of feed rollers which are secured to feed roller shafts having respective intermeshing gears 65, 66, 67, 68 and 69 (Fig. 1) one of which is driven by the ring gear 24. After issuing from the last set of feeding rollers the records which have been analyzed are received by a conventional stacker mechanism so that they are fed to a stack 70, one behind the other as they were originally. As the cards are stacked they move upwardly against a pressure plate 71.

The ring gear 24 meshes with a gear 75 secured to a shaft 76 which shaft may be regarded as the main operating shaft of the present analyzing and translating mechanism since it carries cams and other devices for operating various mechanisms in the required timed relationship. As the necessity for their description arises such mechanisms will be described in detail.

*Record cards*

Figures 9, 10, 11:
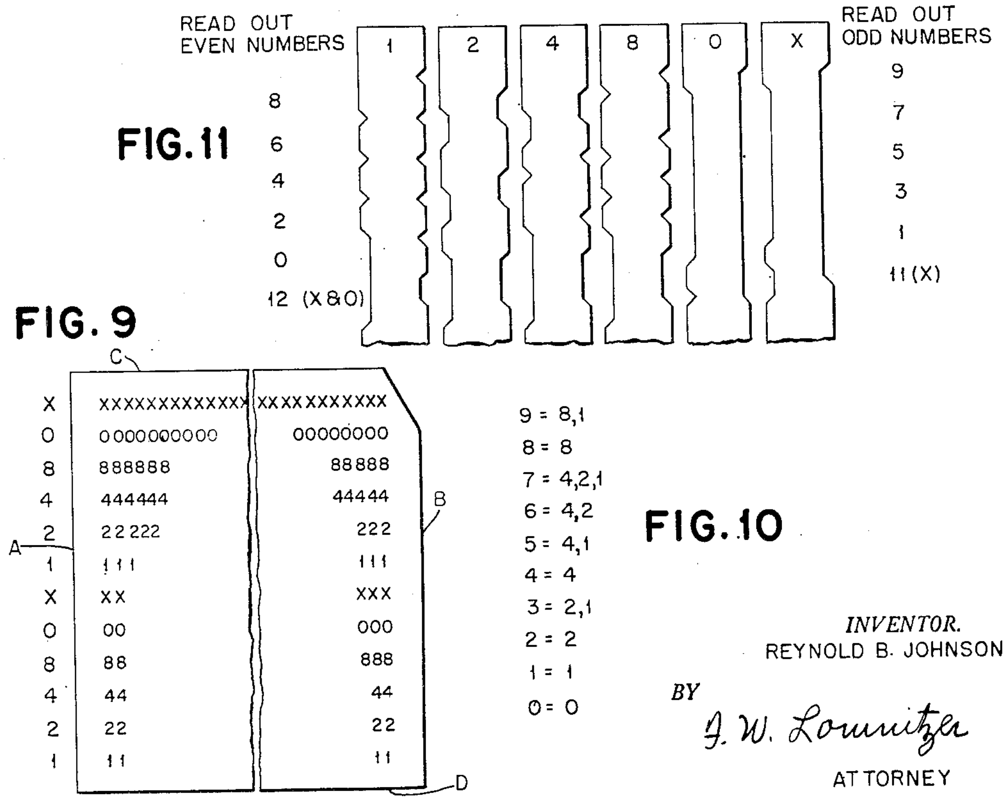
Fig. 9 is a representation of one form of duo-deck perforated card having numerical data represented by coded perforations.
Fig. 10 is a table showing the combination of holes representing the various digits 0–9.
Fig. 11 is a diagram showing the arrangement of coded notches on the permutation bars.

The records 85 to be analyzed by the present analyzer and translator mechanism are shown in Fig. 9 wherein it will be seen that two decks or fields are provided for representing data, each deck or field having 80 columns to thereby accumulatively represent in two decks 160 characters or numerals. This increased capacity is obtained over the conventional 80-column IBM perforated record by having numerical data designated according to a combinational hole code. Any suitable code may be adopted and herein preferably is the binary code wherein the four index point positions represent 1, 2, 4 and 8. A zero is represented by the 0 hole and it, as well as a hole at the X or 11 index point position, may be used for control purposes with holes 1, 2, 4 and 8, or to represent alphabetical characters. The improved analyzer mechanism provides for the translation of the combinational holes so as to emit a differentially timed digit impulse representing any of the digits 0–9 and an additional X impulse if an X control perforation is present.

The cards are fed widthwise, that is to say, with the long edge C of the card shown in Fig. 9 leading, and when in the analyzer said card is analyzed and translated.

*Record shifting mechanism*

Figure 4:
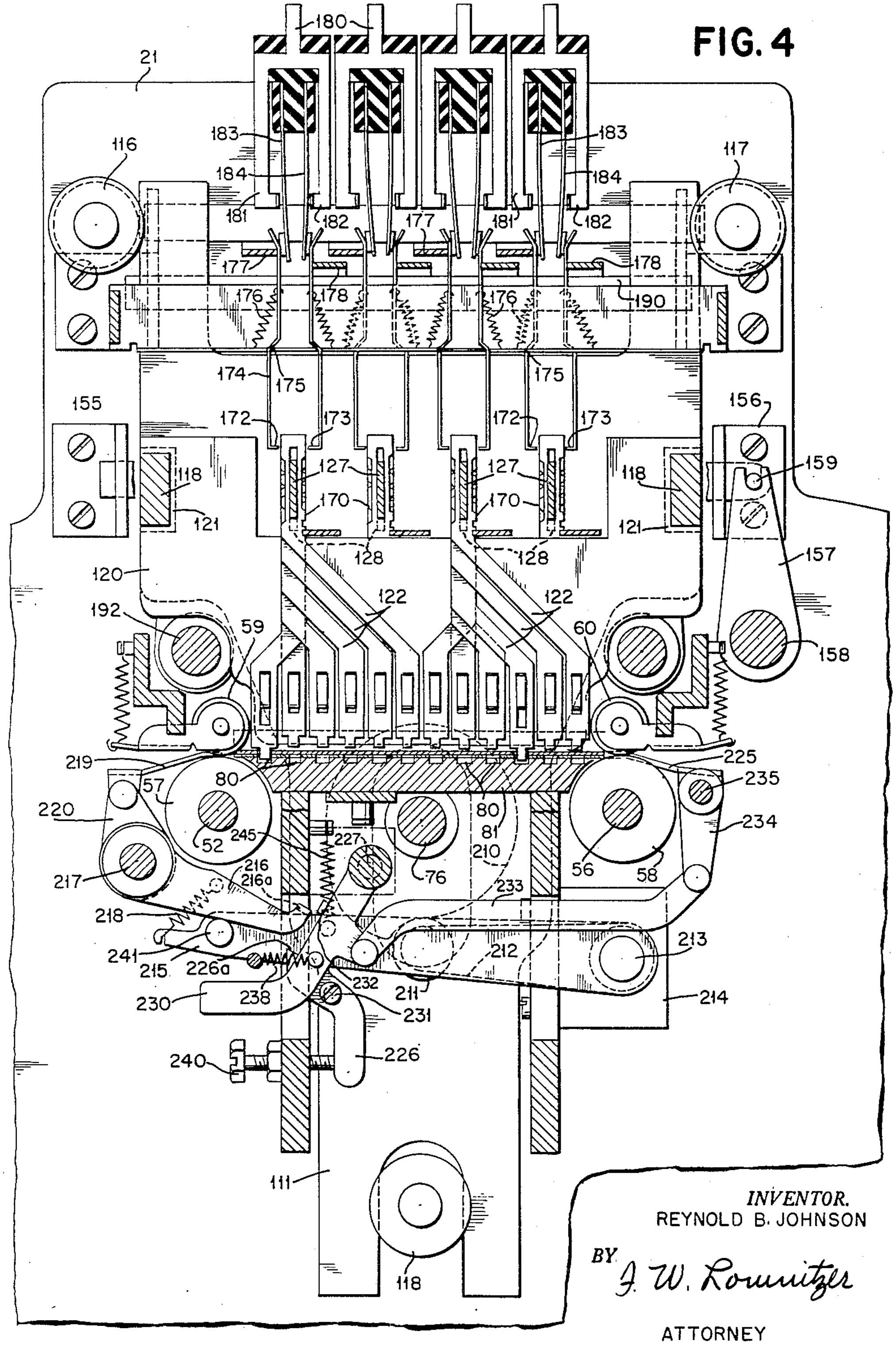
Fig. 4 is a sectional view taken on the line 4—4 of Fig. 2.
Figure 5:
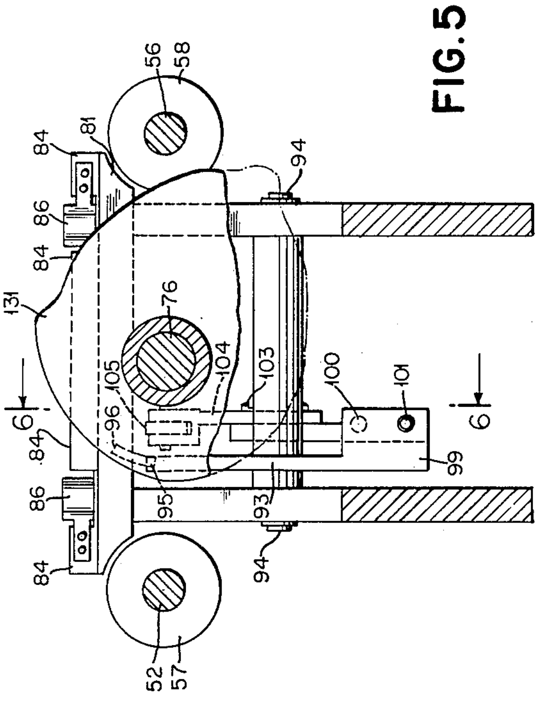
Fig. 5 is a detail view showing some of the parts associated with the means for slightly shifting a table holding the record card to enable passage of the analyzing projections through holes not at true locations.

Underlying the analyzer and translator mechanism is a rectangular stationary table 81 substantially the size of the record card which carries a slidable cover plate 82 (Figs. 2, 5 and 6) for a purpose now to be described. Said cover plate consists of a flat plate having upwardly extending side ledges 83 and 84 between which the narrower marginal edges A and B of the record 85 are placed. In order to resiliently engage said marginal edges, the upstanding ledges 83 and 84 carry a pair of flat springs 86 passing through slots in the ledges and abutting the card edges (see Fig. 5). As shown in Fig. 4 the card 85 is frictionally fed by the rollers 57 and 59 over the cover plate 82, it being understood that there are no upstanding ledges like 83 and 84 for the longer marginal edges of the cover plate so that it may be fed on to and off said cover plate by rollers 58 and 60 after the analyzing and translating operation.

Figure 6:
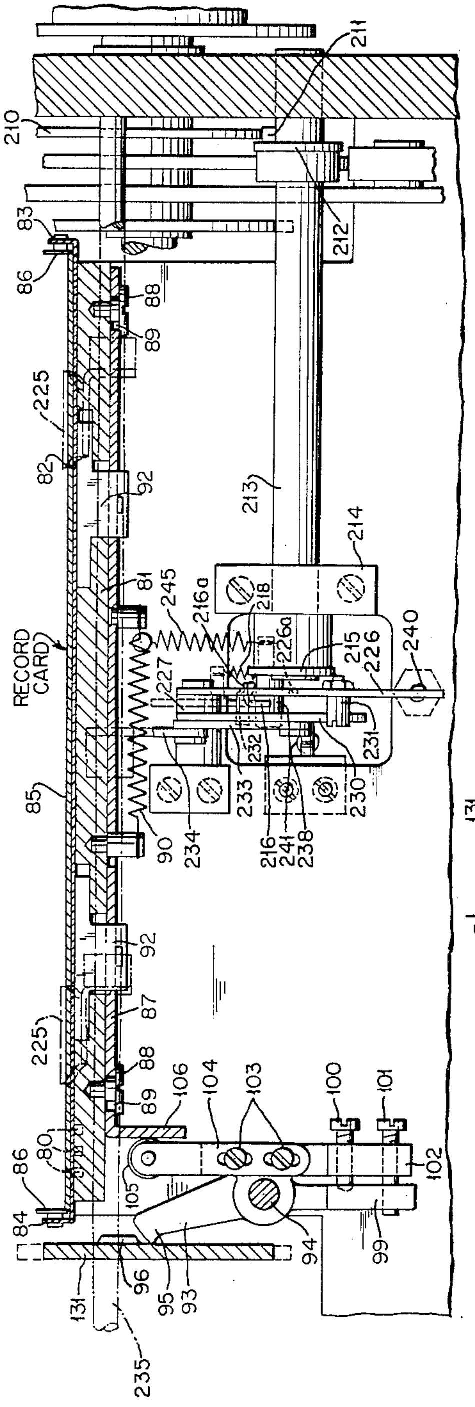
Fig. 6 is a sectional view taken on the line 6—6 of Fig. 5.
Figure 7:
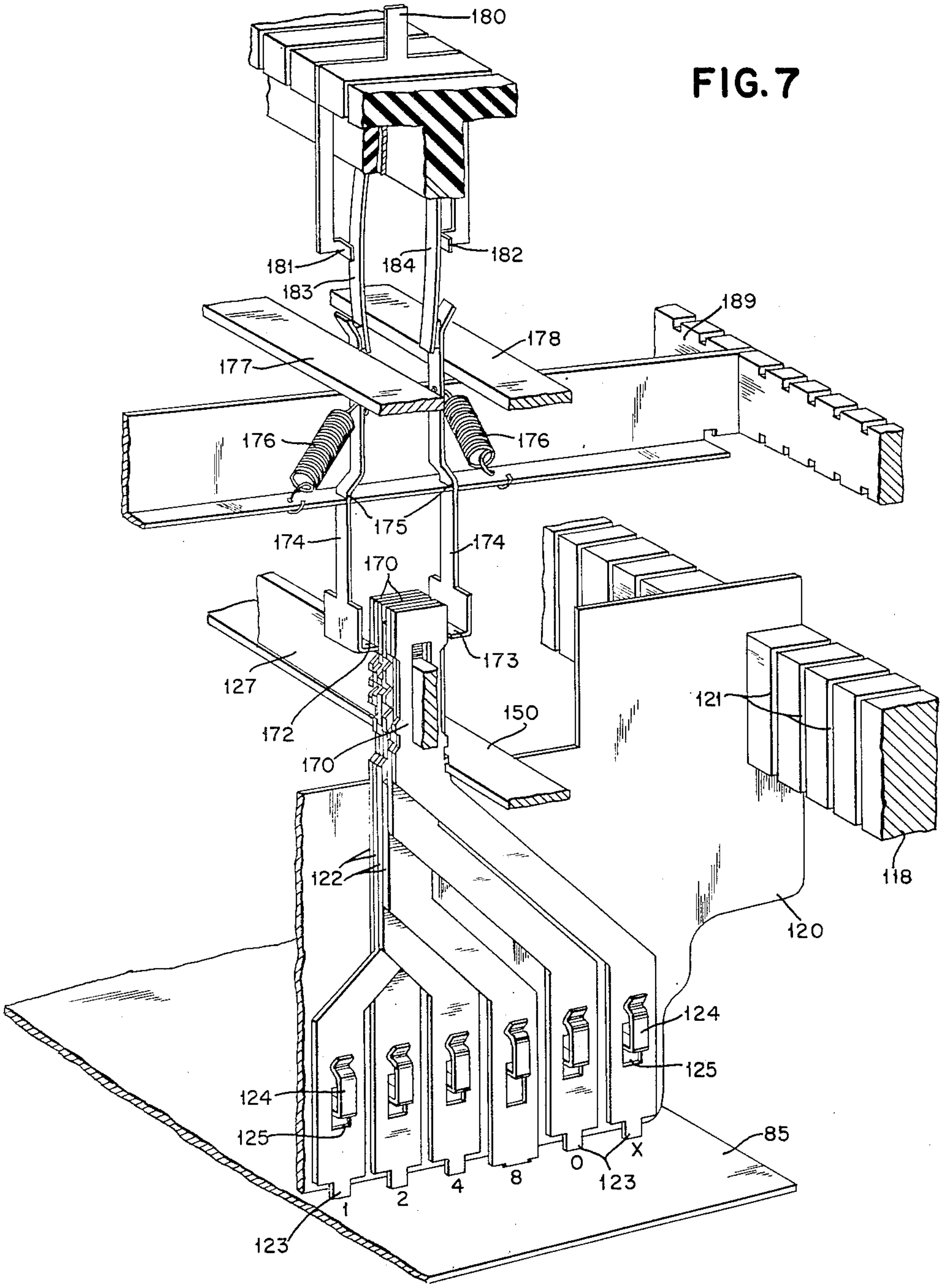
Fig. 7 is a perspective which shows more clearly the assembly of one unit of the improved code translator.

As will be clearer later on, analyzer projections 123 (Fig. 7) are adapted to pass through the rectangular holes in the card 85, through corresponding holes in the cover plate 82 (not shown) and into depressions 80 (Figs. 4 and 6) in the table 81. In order to analyze any rectangular hole in the column which is away from the true location laterally in a column the cover plate 82 and record 85 are adapted to be shifted slightly to the right as shown in Fig. 6 in order that the holes at the left of true locations will be aligned with the related analyzer projections 123, holes in the cover plate 82 and depressions 80 in the table 81. To this end there is slidably mounted on and underneath the table 81 an operating plate 87 (Fig. 6) said plate being slidably mounted by means of screws 88 passing through slots 89 of the operating plate 87. A spring 90 extended between a stud carried by the operating plate 87 and a stud carried by the table 81 is adapted to retain the operating plate 82 in a position shown in Fig. 6, so that operating means may be subsequently effective after the first card analyzing operation to shift said operating plate 87 to the right before the second card analyzing operation for the same card and by means of depending lugs 92 integral with the cover plate 82 fitting in slots in the operating plate 87 the cover plate may be moved likewise.

Said operating means preferably comprises a follower arm 93 secured to a rock shaft 94, said arm having a nose 95 adapted to be engaged by a projection 96 of an operating cam 131. Said rock shaft 94 has a depending arm 99 and by means of adjusting screws 100 and 101 a member 102 is secured to said depending arm 99 and movable therewith. Slidably mounted on said member 102 through adjusting screws 103 is a follower arm 104 carrying a roller 105 engaging a depending projection 106 of operating plate 87.

After the card has been raised above the surface of the card in the first analyzing operation the projection 96 striking the nose 95 rocks said shaft 94 clockwise, causing roller 105 to press against the extension 106 and shift operating plate 87 slightly to the right as viewed in Fig. 6. The extent of this movement is in the order of .020 inch and this dimension is selected so as to correlate rectangular perforations which are at the left out of true hole positions with the analyzing projections. Thereafter, a lowering of such projections 123 will cause them to pass through said holes in the record. It is understood, of course, that the size of the rectangular projections 123, holes in the plate 82 and depressions in table 81 are of such dimensions that there will be no interference with the analyzer projections 123 which pass without interference through the holes in their proper locations. After the second analyzing operation has been effected and the analyzer projections are removed the card spring 90 is operative to return operating plate 87 and also its operating means when projection 96 of cam 131 moves away from the follower arm 93.

It is obvious, therefore, that when the record to be analyzed is fed into a position at rest beneath analyzing projections there is a feed of the record intermediate two analyzing operations so as to insure proper movement of the analyzing projections through the holes in the record even though some have been misplaced a slight amount out of true locations.

*Analyzer mechanism*

Figure 2:
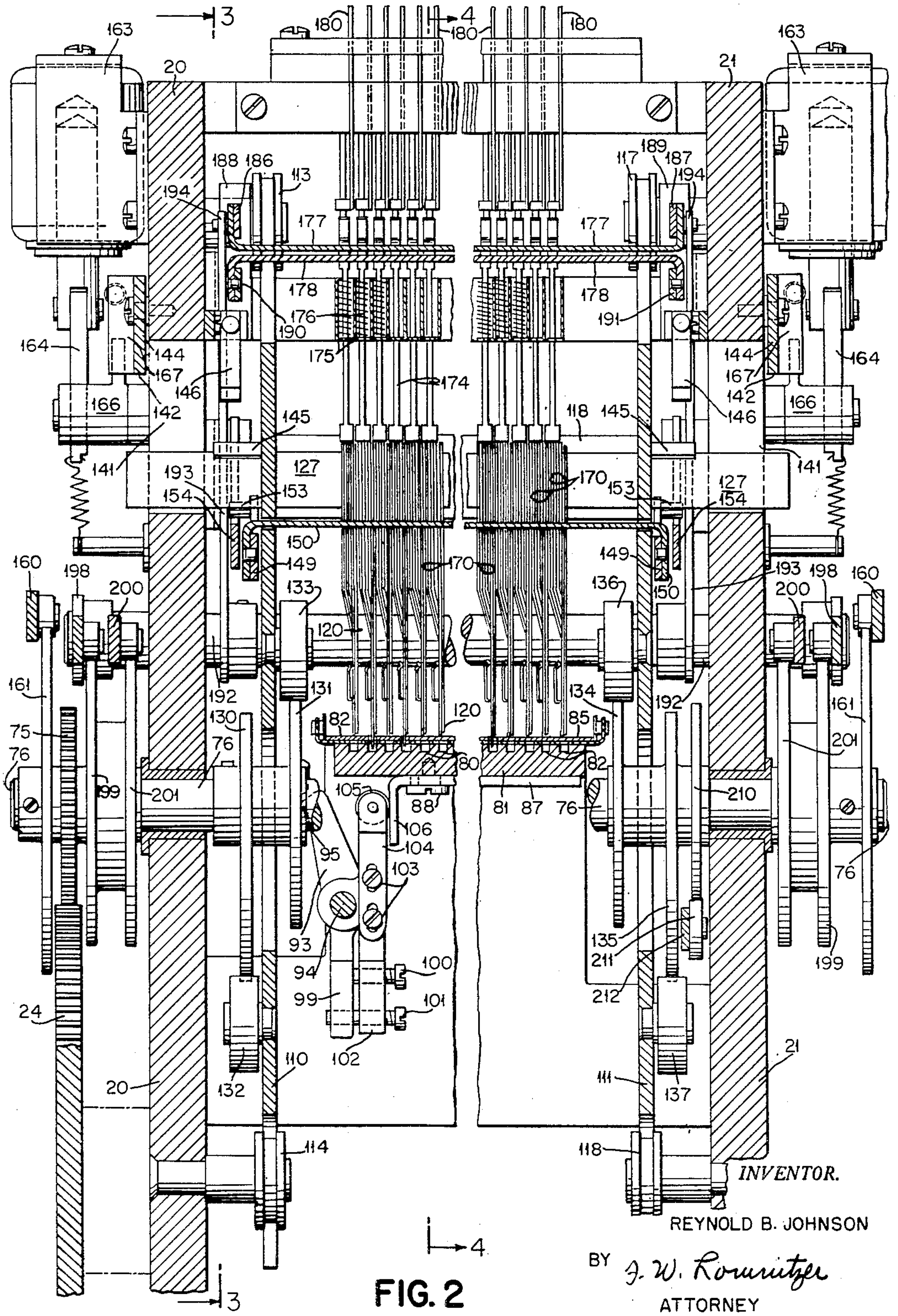
Fig. 2 is a sectional view taken on the line 2—2 of Fig. 1 but on a larger scale.
Figure 3:
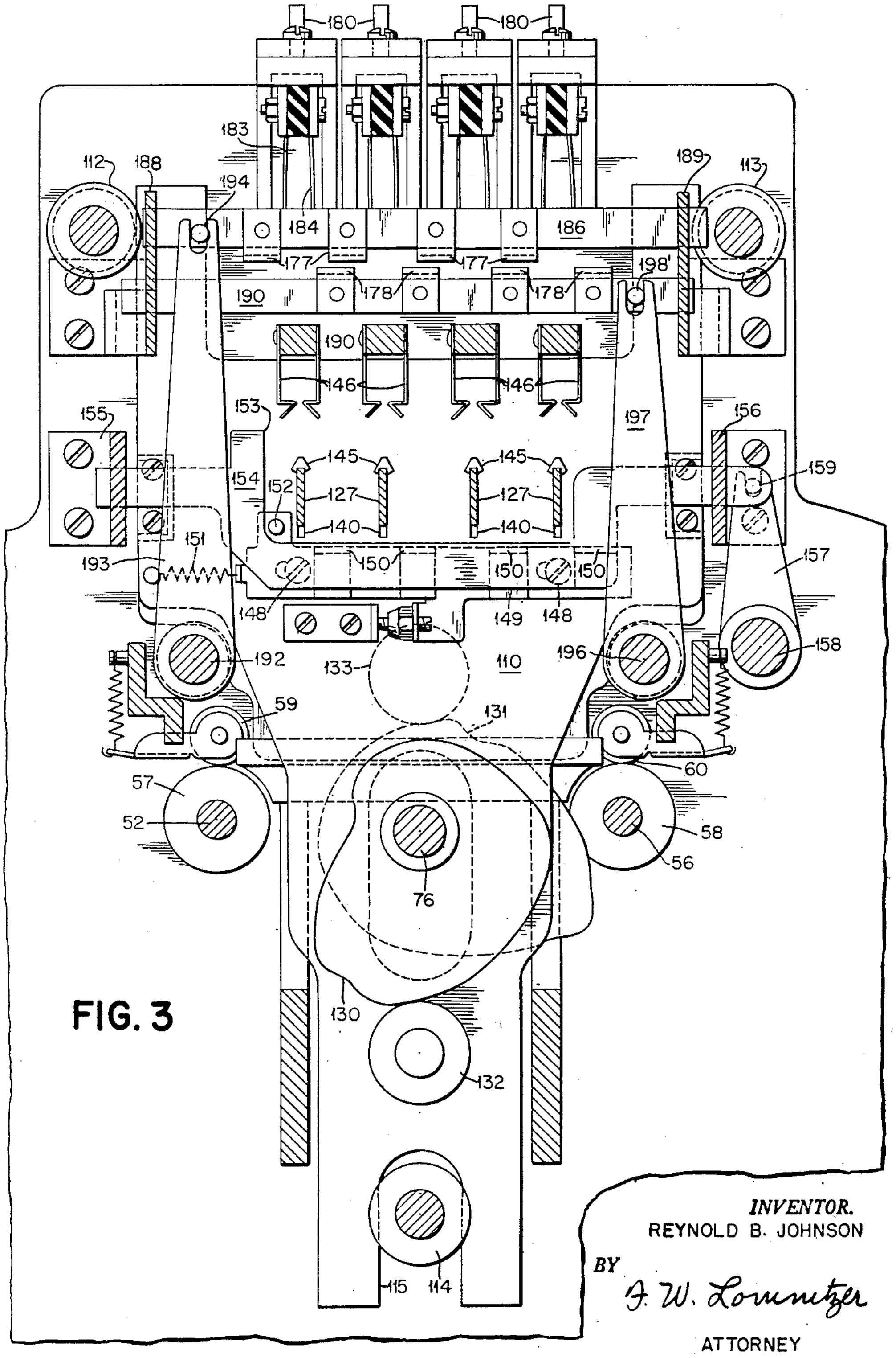
Fig. 3 is a sectional view taken on the line 3—3 of Fig. 2.

The analyzer mechanism is primarily carried by two reciprocable side frame plates 110 and 111 mounted between the side frames 20, 21 as shown in Fig. 2. The frame plate 20 carries, as shown in Fig. 3, guide rollers 112 and 113 to guide the upper part of the side frame plate 110 and a third guide roll 114 engaging a bifurcation 115 at the lower end to guide the lower part of the side frame plate 110. By these guide rollers the side frame plate 110 is guided for reciprocation and, as shown in Fig. 4, similar guide rollers 116, 117 and 118 carried by the side frame plate 21 guide the other frame plate 111. The side frame plates 110 and 111 have attached thereto slotted cross bars 118 to provide a rigid framework structure. Frame plates 110 and 111 also carry other cross members to be referred to as the description ensues.

As previously stated the analyzer mechanism is designed for analyzing a duo-deck card. For this reason the analyzer mechanism is duplicated and in view of this duplication the description of the analyzer mechanism for only one deck will be described.

For each card column there is provided a wafer-like support plate 120, there being 80 of such plates for a corresponding number of vertical card columns. The sides of each support plate 120 are notched so as to be received by slots 121 (Figs. 4 and 7) formed in both of the cross bars 118, said slots being adapted to not only hold the series of 80 support plates 120 but also to provide for a column spacing equivalent to the 80-vertical-column spacing of the record card. Each support plate frictionally carries two sets of analyzer plates 122, each set consisting of six plates, one set for analyzing a column of a card deck and the other set for analyzing the corresponding column of the other deck. The analyzer plates 122 are formed and assembled in such manner that the analyzer projections 123 integral therewith are arranged in a single plane and divergently spaced so as to pass through the holes in the related card column. Above the analyzer projections 123 the analyzer plates 122 are bent upward either from right to left or left to right so that all of the six plates are brought to an overlapping position to form a stack of permutation code bars.

The analyzing plates 122 are held against the associated support plate 120 by means of spring blades 124 (Fig. 7), preferably formed out of the support plate 122, each bent outwardly to pass through a related slot 125 of the analyzer plate 122, and again bent to resiliently press the related analyzer plate 122 to hold the latter against the support plate 120. Such spring elements not only press the analyzer plate 122 against the support plate 120 to hold it in either normal or shifted position and to cause plates 122 to be moved with the support plate 120 but also act to guide each analyzer plate 122 in its movement with relation to support plate 120 and the other analyzer plates 122. The analyzer projections 123 are somewhat smaller, both in length and width than the size of the rectangular holes of the card in which they are adapted to pass through, the width and thickness of the projection being such that after the slight lateral shift of the record card they will pass through not only holes analyzed at true locations but also holes away from true locations, without interference by the former.

An additional means to guide the analyzer plates 122 as they are shifted consists of restoring bars 127, there being a pair of restoring bars 127 for the analyzing mechanism for each deck. Said restoring bars 127 are carried by the side frame plates 110 and 111 and since they pass through slots 140 therein (Fig. 3) they, therefore, move with the analyzer frame. Slots 128 (Fig. 4) are formed in each of the analyzing plates 122 and support plates 120 to receive bars 127. The slots 140 are preferably of such dimensions that they engage the bars 127 rather snugly, that is to say, with a tight fit. The slot 128 in each analyzer plate 122 and support plate 120 is somewhat longer than the restoring bar 127 in order to permit the shifting of all of the analyzer plates 122 which do not engage holes in the column of the record with respect to the support plate 120 and the other analyzer plates of the same set which pass through holes. The analyzer plate 122 which passes through a hole remains in its normal position, as shown in Fig. 4 for the "1" analyzer plate 122 at the left, and for the "8" analyzer plate 122 in Fig. 7. It will be seen in both of these figures that those analyzer plates 122 which do not pass through holes have a different relative position with respect to the analyzer plates 122 which do pass through holes.

Complementary cams 130—131 (Figs. 2 and 3) carried by the drive shaft 76 coact with respective rollers 132—133 carried by the side frame plate 110 and similar cams 134—135 coact with respective rollers 136—137 carried by the side frame plate 111. Cams 130—131 and 134—135 are complementary cams and are adapted to positively raise and lower the analyzer frame according to the timing diagram of Fig. 8.

Figure 8:
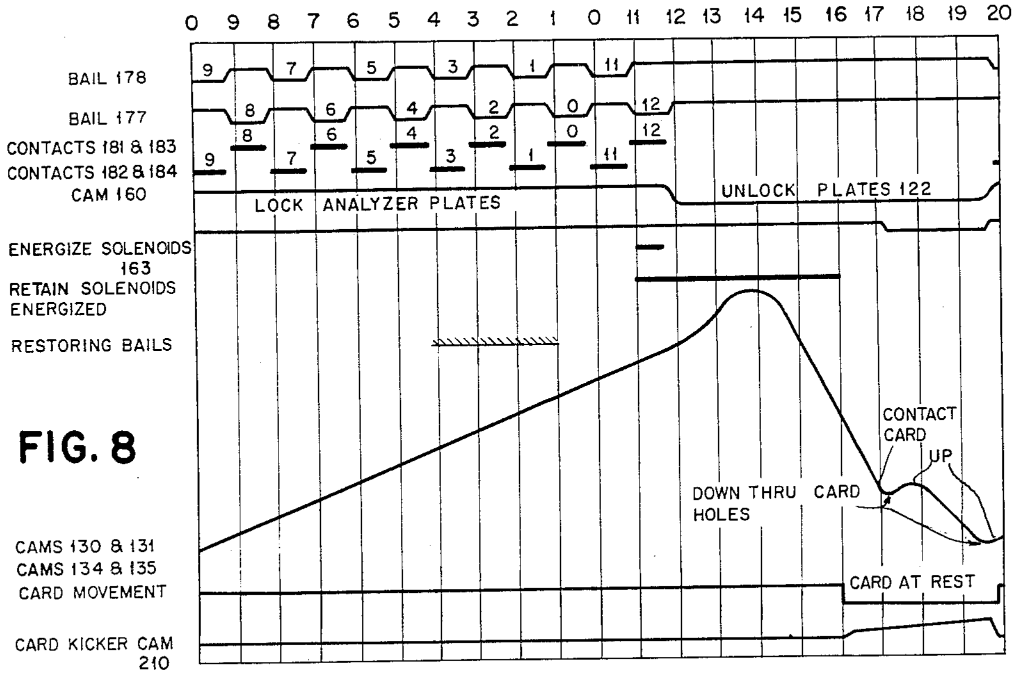
Fig. 8 is a timing diagram.

It will be seen, referring to the timing diagram of Fig. 8, that between 0 to 14 cycle points the analyzer frame is raised upwardly. During this time the combinational hole reading is translated to a differentially timed impulse from the card which has been analyzed during the cycle points 14 to 20 of the preceding card cycle. The manner in which translation is effected will be subsequently described in detail. Thereafter, the analyzer frame is moved downwardly and in the meantime a new card has been moved into analyzing position. At about 16.5 of the cycle the analyzer projections 123 engage the surface card so that at cycle point 17 they pass through the holes in the card to effect the relative displacement of the analyzer plates 122 in accordance with the holes they encounter. Thereafter, cam projection 96 is effected to cause the slight shift of the record card after the analyzer projections 123 have been moved out of contact with the record card. Cams 130—131 and 134—135 are then effective to again depress the analyzer frame so that the analyzer projections 123 pass through any holes which have been offset from normal location, as well as those which are true locations. The analyzer frame is then elevated to carry the projections 123 out of the holes of the record card enabling the latter to be moved out of the analyzer mechanism. From cycle points 18–20 in the last part of the card cycle, the analyzer frame is elevated and will be continued to be elevated between cycle points 0—14 of the next cycle to cause the translation and conversion of the combinational reading to differentially timed impulses in a manner to be subsequently explained.

Since those analyzer plates 122 whose analyzer projections 123 have passed through holes in the card will have a different relative position with respect to the restoring bars 127 and the support plate 120 than those analyzer plates 122 whose projections 123 have not passed through holes in the card, it is desirable that prior to the next card analyzing operation each of the analyzer plates 122 be restored to normal position.

As best shown in Fig. 3 each end of each of the four bars 127 extends through the associated slot 140 in side frame plates 110, 111, through slots 141 (Figs. 1 and 2) in the stationary side frames 20, 21 and outside of each of the side frames 20 and 21. The top edge of each of the ends of bars 127 is adapted when elevated to strike a bottom edge 142 of a respective control slide 144 (Figs. 1 and 2) when the analyzer plates 122 are to be restored to normal, or to enter a notch 143 of the control slides 144 when the control slides are shifted to prevent restoring of the analyzer plates 122 and thus retain the data initially set up in analyzer plates 122.

Assuming that the edge 142 of each control slide 144 is effective, the restoring bars 127 eventually strike said edges in the upward movement of the analyzer frame to thereby stop movement of said bars 127. After this the analyzer frame continues its upward movement, raising all support plates 120 and through the spring blade 124 connection between the support plates 120 and analyzer plates 122 those analyzer plates 122 whose projections 123 passed through the holes in the card are elevated one step so that the related bar 127 fits in the bottom of the slots 128 in both the analyzer plate 122 and support plate 120, and thus said analyzer plates 122 have the same relative position with respect to bar 127 as those analyzer plates 122 which did not have their projections 123 passing through holes in the card.

At this time a pair of arrow-shaped projections 145 formed on the ends of each bar 127 (see Figs. 2 and 3) enters respective spring detent plates 146 so that arrow-shaped projections have their horizontal edges resting on the horizontal portions of spring detent plates 146. This will firmly hold all bars 127 during the initial descent of said analyzer frame during which time the support plates 120 and all analyzer plates 122 are moved a step downward, independent of bars 127, thereby causing all of the restoring bars 127 to fit in the upper ends of the slots 128 in support plates 120 and analyzer plates 122.

This is the normal position required prior to the next analyzing operation and is retained during the lowering of the analyzer frame. Of course, the pulling down of bars 127 by the support plates 120 and analyzer plates 122 causes the bars 127 to be disengaged from the detent spring blades 146 during the initial descent of the analyzer frame.

It may be desirable to provide a more positive means to hold the analyzer plates 122 to the support plates in either normal or shifted position of analyzer plates to thereby assist spring blades 124 in this function. To this end there is slidably mounted on slides 110, 111 by screws 148 a pair of bail supporting plates 149. The two plates 149 carry four bails 150 (Fig. 3), one for each row of analyzing plates 122. To the plates 149 there are connected springs 151 which move the bails 150 frictionally against the related sets of analyzer plates 122 with a detent action to hold them at normal or adjusted position. If so desired, the bails 150 may enter aligning notches in plates 122 so as to impositively hold the analyzer plates 122. Of course, the bails 150 being mounted on the analyzer frame move upwardly with the support plates 120 and when the analyzer plates 122 are to be restored during the initial descent of the analyzer frame, said bails are previously disabled at cycle point 12. As each plate 149 moves up its stud 152 passes along an edge 153 (Fig. 3) of a control slide 154. Said control slide is slidably mounted in brackets 155, 156 carried by the respective side frame 20, 21. From Fig. 3 it will be seen that an arm 157 secured to a rock shaft 158 has a pin and slot connection 159 to the respective control slide 154. Said shaft 158 is rocked clockwise to cause edge 153 engaging stud 152 to move plates 149 to the right to shift all bails 150 out of engagement with the analyzer plates 122. This is initiated by the following described means at cycle point 12 and retained during cycle points 12–20 when such bails 150 should be free of the analyzer plates 122.

Secured to rock shaft 158 is a pair of follower arms 160 (Figs. 1 and 2), each having a roller cooperating with a related profile cam 161 secured to the drive shaft 76. The cam contour of cams 161 rocks said arms 160 and shaft 158 clockwise to shift all bails 150 out of engagement with analyzer plates 122 during cycle points 12–20, as seen in the timing diagram of Fig. 8.

*Means to retain data setup of analyzer plates 122*

Reference has been made to the feature of retaining analyzer plates 122 in their data representing position in the event that data is to be repeatedly printed or entered in an accumulator. To effect this the two control slides 144 are shifted by its respective solenoid 163 (Figs. 1 and 2) so that restoring bars 127 enter notches 143. Said solenoid when energized attracts its core 164 inwardly to cause a link 164 connected thereto to rock a bell crank 166. One arm of said bell crank 166 abuts a lug 167 of the respective control slide 144.

Both solenoids 163 are energized by a pulse at cycle point 11 (see Fig. 8), and to retain it energized during cycle points 11–16 when the analyzing plates 122 would be normally restored, the solenoids may be held energized by an obvious holding circuit effective during such cycle points. Of course, card feed should also be suspended so that data from one card should be retained for repeated use. If so desired, such selective control may be devised for only certain sets of analyzed plates 122. As will now be explained, impulses representing data may be transmitted, and repeatedly for the same data.

*Translator mechanism*

The six analyzer plates 122 extend straight upwardly from where the angularly-bent portions come together, to form a series of six overlapping code bars 170 (Figs. 2, 4 and 7) which are preferably integral with the related analyzer plates. Six of these code bars provide a code bar group for each of the six index point positions of the column but only five are used for numerical data 0–9. The code bars 170 are provided on both edges with irregularly disposed permutation notches 171 to provide conversion from the binary combinational hole digit code to the single unit digit code. Cooperating with the notches 171 at one edge of the code bars 170 is a related seeker member 172 which provides for the readout of even digit impulses, and cooperating with the notches 171 on the other edge of the code bars 170 is a seeker member 173 which provides for the readout of the odd digit impulses. Of course, the notches 171 could all be on one edge of the code bars and a single seeker member cooperating therewith, but the two groups of notches and pair of seeker members are preferable since it facilitates the arrangement of parts for closely spaced card columns.

The permutation notches 171 are so arranged on each side of the code bars that the relative movement of certain analyzer plates 122 with respect to the other will provide on the edges of the code bars a clear entry path for either seeker member 172 or 173 at different positions, depending upon the different relative positions of analyzer plates 122. For example, to translate the coded combination of 9 to a differential digit 9 impulse, analyzer plates 1 and 8 are moved relative to the other analyzer plates 0, 2 and 4 to thus provide a clear entry notch at the "9" position (see Fig. 11) across all coded bars on the edge that seeker member 173 engages. However, if the coded representation was 8, code bar 8 would be shifted relative to code bars 0, 1, 2 and 4, and provide a clear entry notch at the "8" position for seeker member 172 across all coded bars on the other edge. A further explanation for remaining digits is not necessary since at successive digit times 9, 8, 7, 6, 5, 4, 3, 2, 1, 0, either seeker members 172 or 173 will have a clear entry notch whenever the analyzer plates are relatively set up in a coded representation to designate such digits. Bar 11 or X is so displaced relative to the others, due to the entry of related analyzer projection 123 in the 11 or X hole, that the seeker member has a clear entry notch at the 11 position to transmit an X or 11 impulse. The readout is preferably effected at differential times so as to transmit differentially timed impulses by closing of contacts in a work circuit, as will now be explained.

Seeker members 172 or 173 have integral plates 174 (Figs. 4 and 7) pivoted at 175 and urged by springs 176 so as to attempt to enter the permutation notches in the coded bars. This action is prevented by a pair of bars 177 or 178 which operate alternately under control of cams so that seeker members 172 and 173 may be alternately effective to read out the coded bars at their successive 0–9 digit positions as they are elevated by the analyzer frame.

For each column of a deck there is provided a common contact strip 180 having two contact blades 181, 182, and between said strip 180 there are two blades 183, 184, blade 183 being held out of contact with blade 181 by bar 177, and blade 184 being held out of contact with blade 182 by bar 178. Thus, the bars 177 and 178 will alternately permit seeker members 172 and 173 to find a clear entrance notch across the edges of the coded bars in their successive differential positions, and upon finding such, either seeker member 172 or 173 will enter therein and close respective contacts 181—183 or 182—184. Such contacts may complete a circuit to a print magnet of a well known form of machine shown in the patent to R. E. Page et al., No. 2,438,071 at a differential time to control by digit impulses printing and accumulation of digit data. At 11 an impulse is transmitted in the same way for a "11" selecting function, as is well known in electrical record controlled accounting machines.

It should be noted that if a member 172 or 173 does not clear a notch the code bar will elevate the member 172 or 173 against the action of spring 176 which functions to return the member when it is finally out of the cooperating notch 171.

The bails 177 are U-shaped members carried by pairs of slides 186, 187 (Figs. 2, 3 and 4) slidable in brackets 188, 189 attached to the respective side frame 20, 21. Similarly, bails 178 are U-shaped members carried by pairs of slides 190, 191 also slidable in the brackets 188, 189. Secured to a rock shaft 192 is a pair of arms 193, each having a pin and forked connection 194 to the slides 186, 187. Also secured to a rock shaft 196 is a pair of arms 197, each having a pin and forked connection 198' to the slides 190, 191. Attached to the rock shaft 192 is a pair of follower arms 198 cooperating with cams 199 secured to drive shaft 76, and similarly attached to the rock shaft 196 is a pair of follower arms 200 cooperating with cams 201. Said cams 199 and 201 are timed so as to alternately rock shafts 196 and 192 and thus the respective bails 177 and 178 for causing successive readout of the coded bars.

*Card stops and card ejecting mechanism*

This mechanism has two purposes, first to position the card for the static analysis of the card and second, after the analysis has been completed to kick the card so as to be seized by feed rollers 58—60 which then eject the card.

At cycle point 16 (Fig. 8) the card has reached the analyzing mechanism; the trailing edge of the card having left the feed rollers 57—59 the card rests on the table between the sets of feed rollers 57—59 and 58—60.

Cam 210 (Fig. 4) secured to the drive shaft 76 near the rear frame cooperates with a follower roller 211 carried by an arm 212 which is secured to rock shaft 213. The shaft 213 is mounted in bearings in the rear frame and a plate 214.

When the trailing edge of the card leaves the sets of rollers 57—59 the rise on the cam 210 engaging the cam roller 211 of the follower arm 212 rocks said arm 212 in a counterclockwise direction. An arm 215 fastened to the rock shaft 213 is rocked in a similar direction. An arm 216 is secured to a rock shaft 217 which extends between the two side frames and has a connection to arm 215 through a spring 218. A kicker plate 219 is positioned between the sets of feed rollers 57—59 and is pivotally mounted on a pair of arms 220 secured to the rock shaft 217.

As the arm 215 and shaft 213 are rocked in a counterclockwise direction the connecting spring 218 rocks the arm 216 and shaft 217 clockwise. Said arm 216, through rock shaft 217 and arms 220 push the kicker plate 219 to the right to contact with the trailing edge of the card. Said kicker plate pushes the card to the right on the table until its leading edge contacts the edges of the card stop plate 225. The card is now in position for analysis.

During this operation the bent-over lug **216*a* of the arm 216 ultimately engages the stop shoulder 226*a* of an arm 226 pivoted on a stud 227. In the further movement of arm 215 after arm 216 is stopped the spring 218** is extended.

These parts remain so positioned during the analyzing operation and there is no further movement of the card on the table, although the arm 215 is still further rocked counterclockwise.

An arm 230 also pivoted on the stud 227 carries an adjustable eccentric stud 231 and a lug 232. A short extension of arm 230 has a pivot connection to link 233, and said link 233 is connected to one of two arms 234 secured to a rock shaft 235 and carrying the stop plate 225.

A spring 238 normally tends to rock the arm 230 about the stud 227 in a clockwise manner but the arm 230 is held in position shown against the lug 232. An adjustable stop screw 240 is provided to initially position both arms 226 and 230.

When the card analysis is completed a stud 241 carried by arm 215 strikes the top edge of the arm 230 and the arm 230 is rocked in counterclockwise direction. Through the link 233 the arms 234 and the rock shaft 235 are rocked in the same direction and the card stop plate 225 which is secured to arms 234 attached to the rock shaft 235 is then lowered so as to offer no obstruction to an ejected card.

As the rise of cam 210 continues to be effective the stud 241 rocks the arm 230 counterclockwise until the arm 230 contacts the adjustable stud 231. The arm 226 is then rocked counterclockwise.

As previously stated the arm 216 has been stopped by the shoulder **226*a*. When the arm 226 is rocked counterclockwise the stop shoulder 226*a* rides away from the lug 216*a* and the arm 216 now being free is now rocked clockwise by the tensioned spring 218 and snaps against the stud 241. This rocks shaft 217, arms 220 and causes the card kicker plate 219 to kick the card off the plate to the feed rollers 58—60** which are now rotating to eject the card.

By means of a spring 245 attached to arm 226 and under the action of the cam 210 the parts just described are restored to normal.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a translator mechanism, a set of contacts, a set of analyzing members for analyzing holes in a record combinationally arranged to represent digits, a set of code bars integral with said analyzing members and having permutation notches for conversion of the combinational multiple position digit code to a single position digit code, a seeker member movable across said permutation notches for finding an aligned entrance notch, a reciprocable support member carrying said set of analyzing members, means to hold said set of analyzing members in adjusted position on said support member to retain the set of analyzing members and set of code bars in different relative positions with respect to the others in the set in accordance with the combination of holes the analyzing members pass through, means to reciprocate said support plate and said analyzing members with respect to said record to analyze said holes to effect said relative position of said analyzing members and code bars; and thereafter move said support plate, analyzing members and code bars in a definite timed operation to enable said seeker member to seek an aligned entrance notch at each successive position of said code bars, means for moving said seeker member across said code bars at each successive position, and means controlled by said seeker member upon finding an entrance notch to close said contacts.

2. In a translator mechanism, a set of contacts, a set of analyzing members for analyzing holes in a record combinationally arranged to represent digits, a set of code bars moved by the set of analyzing members and having permutation notches for converting the combinational multiple position code to a single position digit code, a seeker member movable across said permutation notches for finding an aligned entrance notch, means to reciprocate said analyzing members with respect to said record to analyze said holes to effect a relative position of analyzing members and code bars with respect to the others in the set in accordance with the combination of holes the analyzing members pass through, means to hold said set of analyzing members and code bars in said different relative positions, means to thereafter move said code bars in a definite timed operation to enable said seeker member to seek an aligned entrance notch at each successive position of said code bars, means for moving said seeker member across said bars at each successive position of said code bar, and means controlled by said seeker member upon finding an aligned entrance notch to close said contacts.

3. In a translator mechanism, a set of contacts, a set of plates formed to be divergently spaced at one end to correspond with the spacing of combinationally arranged holes in a record to analyze said holes and having code bars integral with said plates and formed at the other end so as to provide a stack of code bars having a set of permutation notches for conversion of the combinational multiple position digit code to a single position digit code, a seeker member movable across said permutation notches for finding an aligned notch, means to reciprocate said analyzing plates relative to said record to analyze said holes to effect a relative position of said analyzing plates and code bars with respect to the others in the set in accordance with the combination of holes the analyzing plates pass through, means to hold said set of analyzing plates and code bars in different relative positions, means to move said code bars when held in said different relative positions to present successive groups of notches to said seeker member to cause said seeker member to seek an entrance notch, means to move said seeker member as the groups of notches are presented therewith, and means controlled by said seeker member upon finding an entrance notch to close said contacts.

4. In a translator mechanism, a set of contacts, a set of plates formed at one end to be divergently spaced to correspond with the spacing of combinationally arranged holes in a record to analyze said holes and having code bars integral with said plates and formed at the other end so as to provide a stack of code bars having a set of permutation notches for conversion of the combinational digit code to a single unit digit code, a movable seeker member cooperating with said permutation notches for finding an aligned notch across said bars, a reciprocable support plate carrying said plates and code bars, means to reciprocate said support plate and thereby said analyzing plates with respect to said record to analyze said holes to effect a relative position of said analyzing plates and code bars with respect to the others in the set in accordance with the combination of holes the analyzing plates pass through, resiliently operated means carried by said support plate to hold said set of analyzing plates and code bars in different relative positions on said support plate, means to move said support plate, said analyzing plates and code bars when in said different relative positions to present successive groups of notches to said seeker member to cause said seeker member to seek an aligned entrance notch, means to move said seeker member across said notches as the successive groups of notches are presented thereto, means controlled by said seeker member upon finding an entrance notch to close said contacts, and means to restore said analyzing plates which were adjusted out of normal position with respect to the other analyzing plates in the set.

5. In a translator mechanism, a set of contacts, a set of analyzing members for analyzing holes of a record member combinationally arranged to represent digits, a set of code bars each integral with the related one of said analyzing members and having for the set permutation notches for conversion of the combinational unit code to a single unit digit code, a movable seeker member cooperating with said permutation notches for finding an aligned notch across said code bars, a reciprocable support member carrying said set of analyzing members, means to retain the analyzing members and code bars in adjusted positions in accordance with the combination of holes the analyzing members pass through, means to successively reciprocate said analyzing members to twice analyze said holes to adjust certain of said analyzing members and code bars relative to the others in the set, and thereafter moving said analyzing members and code bars relative to said seeker member in a definite timed operation to enable said seeker member to seek at successive times an aligned entrance notch across a certain position of the adjusted code bars, means to shift said record member relative to said analyzing plates intermediate said two analyzing operations to enable holes not having true locations to be analyzed, and means controlled by said seeker member upon finding an aligned entrance notch across said bars to close said contacts.

6. In a translator mechanism, a plurality of contacts, a set of plates formed at one end to be divergently spaced to correspond with the spacing of combinationally arranged holes to analyze said holes and having code bars integral with said plates and formed at the other end so as to provide a stack of code bars having on opposite sides a set of permutation notches for conversion of the combinational digit code to a single unit digit code, a pair of seeker members each cooperating with the permutation notches on one side for finding an aligned entrance notch, means to reciprocate said analyzing plates to analyze said holes to effect a relative position of said analyzing plates and code bars with respect to the others in the set in accordance with the combination of holes the analyzing plates pass through, means to hold said set of analyzing plates and code bars in different relative positions, means to move said code bars when in said different relative positions to present successive groups of notches to said pair of seeker members to cause said seeker members to seek an aligned entrance notch, means to move said seeker members alternately to seek an aligned entrance notch first on one side then the other side as said code bars are moved, means controlled by either of said seeker members upon finding an aligned entrance notch to close said contacts, and means to restore the analyzing plates which were adjusted out of normal position with respect to the other analyzing plates in the set.

No references cited.